United States Patent
Wang et al.

(10) Patent No.: US 10,521,080 B2
(45) Date of Patent: *Dec. 31, 2019

(54) DISPLAY METHOD AND DEVICE FOR MENU KEY OF TOUCHSCREEN MOBILE TERMINAL

(71) Applicant: Tencent Technology (Shenzhen) Company Limited, Shenzhen (CN)

(72) Inventors: Xiaoou Wang, Shenzhen (CN); Lu Wan, Shenzhen (CN); Wei Zhang, Shenzhen (CN); Hongwei Yuwen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 301 days.

This patent is subject to a terminal disclaimer.

(21) Appl. No.: 15/382,291

(22) Filed: Dec. 16, 2016

(65) Prior Publication Data

US 2017/0102841 A1 Apr. 13, 2017

Related U.S. Application Data

(63) Continuation of application No. 14/349,065, filed as application No. PCT/CN2012/087776 on Dec. 28, 2012, now Pat. No. 9,552,139.

(30) Foreign Application Priority Data

Apr. 6, 2012 (CN) .......................... 2012 1 0099599

(51) Int. Cl.
*G06F 3/0482* (2013.01)
*G06F 1/16* (2006.01)
(Continued)

(52) U.S. Cl.
CPC .......... *G06F 3/0482* (2013.01); *G06F 1/1694* (2013.01); *G06F 3/041* (2013.01);
(Continued)

(58) Field of Classification Search
None
See application file for complete search history.

(56) References Cited

U.S. PATENT DOCUMENTS 9,176,620 B2 * 11/2015 Ryu ....................... G06F 3/0416
2009/0213086 A1 * 8/2009 Chae .................... G06F 3/0482
345/173
(Continued)

FOREIGN PATENT DOCUMENTS

CN 1825265 A 8/2006
CN 101158889 A 4/2008
(Continued)

OTHER PUBLICATIONS

PCT Search Report and Written Opinion for PCT/CN2012/087776, dated Mar. 14, 2013.
(Continued)

*Primary Examiner* — Beau D Spratt
(74) *Attorney, Agent, or Firm* — Anova Law Group, PLLC

(57) ABSTRACT

Provided are a display method and device for a menu key of a touchscreen mobile terminal, which relate to the technical field of mobile terminals. The method comprises: obtaining relative states of the left side and the right side of the screen of a touchscreen mobile terminal; and when the left side of the screen is higher than the right side thereof, displaying a menu key at the higher side of the screen. The present invention determines relative states of the left side and the right side of the screen of a touchscreen mobile terminal through a gravity sensor, thereby being able to judge the
(Continued)

current operating state such as holding the touchscreen mobile terminal by the left hand, holding the touchscreen mobile terminal by the right hand of a user according to the relative states, and then setting the menu key in the position where the user can easily operate. The embodiments of the present invention take into account the operation habit of the user while determining the display position of the menu key, better facilitate the operation of the user on the menu key, improve the user experience, and better achieve the interaction between the user and the touchscreen mobile terminal.

20 Claims, 4 Drawing Sheets

(51) Int. Cl.
   *G06F 3/0487* (2013.01)
   *H04M 1/725* (2006.01)
   *G06F 3/0488* (2013.01)
   *G06F 3/041* (2006.01)
   *G06F 3/0484* (2013.01)

(52) U.S. Cl.
   CPC ........ *G06F 3/0487* (2013.01); *G06F 3/04847* (2013.01); *G06F 3/04886* (2013.01); *H04M 1/72519* (2013.01); *H04M 2250/12* (2013.01)

(56) References Cited

U.S. PATENT DOCUMENTS

| | | | |
|---|---|---|---|
| 2009/0228820 A1 | 9/2009 | Kim et al. | |
| 2010/0017734 A1* | 1/2010 | Cummins | G06F 3/0486 715/769 |
| 2010/0066763 A1* | 3/2010 | Macdougall | G06F 1/1626 345/656 |
| 2010/0087230 A1 | 4/2010 | Peh et al. | |
| 2010/0088639 A1* | 4/2010 | Yach | G06F 1/1626 715/825 |
| 2010/0122194 A1* | 5/2010 | Rogers | G06F 3/04817 715/769 |
| 2010/0259561 A1* | 10/2010 | Forutanpour | G06F 3/0216 345/660 |
| 2010/0299635 A1 | 11/2010 | Oh et al. | |
| 2011/0083103 A1* | 4/2011 | Shim | G06F 3/0482 715/810 |
| 2011/0161884 A1 | 6/2011 | Dugan et al. | |
| 2011/0164058 A1 | 7/2011 | Lemay | |
| 2012/0188243 A1 | 7/2012 | Fujii et al. | |
| 2012/0297328 A1* | 11/2012 | Tanaka | G06F 3/048 715/769 |
| 2012/0306903 A1* | 12/2012 | Griffin | G06F 1/1694 345/589 |
| 2013/0176264 A1 | 7/2013 | Alameh et al. | |
| 2013/0201155 A1* | 8/2013 | Wu | G06F 3/03547 345/174 |

FOREIGN PATENT DOCUMENTS

| | | |
|---|---|---|
| CN | 101697556 A | 4/2010 |
| CN | 101853125 A | 10/2010 |
| CN | 102043572 A | 5/2011 |
| CN | 201876860 A | 6/2011 |
| EP | 2207077 A1 | 7/2010 |
| WO | 2011080060 A1 | 7/2011 |

OTHER PUBLICATIONS

Chinese Search Report and First Office Action for 201210099599.X, dated Aug. 5, 2015.

* cited by examiner

DISPLAY METHOD AND DEVICE FOR MENU KEY OF TOUCHSCREEN MOBILE TERMINAL

This application is a continuation of U.S. patent application Ser. No. 14/349,065, filed on Apr. 1, 2014, which is claims priority to PCT/CN2012/087776, filed on Dec. 28, 2012, which claims priority to Chinese patent application No. 201210099599.X entitled "DISPLAY METHOD AND DEVICE FOR MENU KEY OF TOUCHSCREEN MOBILE TERMINAL" filed with the Chinese patent office on Apr. 6, 2012, which is incorporated by reference herein in its entirety.

TECHNICAL FIELD

The present disclosure relates to the technical field of mobile terminal, and in particular to a display method and device for a menu key of a touch screen mobile terminal.

BACKGROUND ART

With the development of communication technologies, mobile terminals have been greatly involved in people's daily life. In the recent years, touch screen mobile terminals have become widespread; they can provide various applications for users and achieve a better human-machine interaction.

The applications in touch screen mobile terminals typically include a plurality of function options. As a touch screen mobile terminal has a screen of a limited size, the function options cannot be all displayed on a single interface. As a result, several function options are often associated with a menu key, and only the menu key is displayed on the screen while all the function options associated with the menu key are hidden. When a user wants to use a function associated with the menu key, the menu key is hit and all the function options associated with this menu key will pop up to display on the current screen. For example, when a user is editing an SMS message, a menu key will typically be displayed on the screen (and often near the input box); upon hitting the menu key, functions such as "picture", "contact information", "ringing tone", etc. will pop up for a further operation by the user, e.g. inserting a picture.

The inventors found that at least the following problem exists in the prior art.

In prior art touch screen mobile terminals, a menu key is displayed at the same position regardless of different holding manners in which the user holds the touch screen mobile terminal. This results in a difficulty in selecting the menu key, and this inconvenience leads to a deteriorated user experience.

SUMMARY OF THE DISCLOSURE

In light of the problem in the prior art that the menu key is displayed at a fixed position, which leads to an inconvenient operation, embodiments of the disclosure provides a display method and device for a menu key of a touch screen mobile terminal. The technical solutions may be summarized as follows.

In an embodiment, a computer-implemented method for releasing a commodity is provided including: receiving commodity information from a client by a server; querying in a database, by the server, commodity order information corresponding to the commodity within a predetermined time period; obtaining, by the server, an average price for the commodity based on the commodity order information; and sending the average price and/or a price cut extent to the client by the server.

In an aspect, an embodiment of the disclosure provides a display method for a menu key of a touch screen mobile terminal, the method including:
obtaining a relative state of left and right sides of a screen of the touch screen mobile terminal; and
displaying, on condition that the left side of the screen is higher than the right side or the right side is higher than the left side, the menu key at the higher side of the screen.

Preferably, the step of obtaining the relative state of left and right sides of the screen of the touch screen mobile terminal may include:
determining an orientation of the screen of the touch screen mobile terminal via gravity sensing, the orientation of the screen including landscape and portrait; and
determining the relative state of the left and right sides of the touch screen mobile terminal in accordance with the determined orientation of the screen.

The method may further include:
recording operation information for the menu key within a predetermined period, wherein the operation information includes an operation trajectory in which a user operates the menu key, the relative state of left and right sides of the screen and the orientation of the screen of the touch screen mobile terminal when being operated, and a type of the operation trajectory, the type of the operation trajectory including a valid operation trajectory and an invalid operation trajectory; and
calculating display positions for the menu key corresponding to various relative states in different orientations of the screen for a next period in accordance with the operation information and a display position for the menu key within a current period.

Specifically, the step of calculating display positions for the menu key corresponding to various relative states in different orientations of the screen for the next period in accordance with the operation information and the display position for the menu key within the current period may include:
calculating the display positions for the menu key corresponding to various relative states in different orientations of the screen for the next period respectively based on the equation of:

$$Vc = A*Vi + (1-A)*Vj,$$

wherein A indicates a value of ratio of a number of the valid operation trajectories to the invalid operation trajectories corresponding to various relative states in different orientations of the screen within the period, Vi indicates coordinates of the display position for the menu key within the current period, and Vj indicates average position coordinates for the invalid operation trajectories.

Optionally, after obtaining the relative state of left and right sides of the screen of the touch screen mobile terminal, the method may further include: displaying the menu key at a predetermined position on the screen of the touch screen mobile terminal on condition that the left and right sides are on an equal level.

Preferably, after displaying the menu key at the higher side of the screen, the method may further include:
displaying function options corresponding to the menu key along a predetermined path on condition that the menu key is hit;

displaying function options corresponding to the menu key along a slide path of the menu key on condition that the menu key is slid; and displaying function options corresponding to the menu key along a user-specified path on condition that the menu key is hit.

In another aspect, an embodiment of the disclosure provides a display device for a menu key of a touch screen mobile terminal, the device including:

an obtaining module configured to obtain a relative state of left and right sides of a screen of the touch screen mobile terminal; and a display module configured to display, on condition that the left side of the screen is higher than the right side or the right side is higher than the left side, the menu key at the higher side of the screen.

Preferably, the obtaining module may include:

a first determination unit configured to determine an orientation of the screen of the touch screen mobile terminal via gravity sensing, the orientation of the screen including landscape and portrait; and a second determination unit configured to determine the relative state of the left and right sides of the touch screen mobile terminal in accordance with the determined orientation of the screen.

The device may further include:

a recording module configured to record operation information for the menu key within a predetermined period, wherein the operation information includes an operation trajectory in which a user operates the menu key, the relative state of left and right sides of the screen and the orientation of the screen of the touch screen mobile terminal when being operated, and a type of the operation trajectory, the type of the operation trajectory including a valid operation trajectory and an invalid operation trajectory; and a calculation module configured to calculate display positions for the menu key corresponding to various relative states in different orientations of the screen for a next period in accordance with the operation information and a display position for the menu key within a current period.

Specifically, the calculation module may be configured to calculate the display positions for the menu key corresponding to various relative states in different orientations of the screen for the next period respectively based on the equation of:

$$Vc=A*Vi+(1-A)*Vj,$$

wherein A indicates a value of ratio of a number of the valid operation trajectories to the invalid operation trajectories corresponding to various relative states in different orientations of the screen within the period, Vi indicates coordinates of the display position for the menu key within the current period, and Vj indicates average position coordinates for the invalid operation trajectories.

Optionally, the display module may be further configured to display the menu key at a predetermined position on the screen of the touch screen mobile terminal on condition that the left and right sides are on an equal level.

Preferably, the display module may be further configured to: display function options corresponding to the menu key along a predetermined path on condition that the menu key is hit; display function options corresponding to the menu key along a slide path of the menu key on condition that the menu key is slid; and display function options corresponding to the menu key along a user-specified path on condition that the menu key is hit.

In another aspect, an embodiment of the disclosure provides a mobile terminal including a processor and a transceiver, the processor and the transceiver being coupled together, wherein the processor is configured to obtain a relative state of left and right sides of a screen of the touch screen mobile terminal; and display, on condition that the left side of the screen is higher than the right side or the right side is higher than the left side, the menu key at the higher side of the screen; and the transceiver is configured to establish communication between the mobile terminal and another mobile terminal or a wireless network to implement data receiving and transmitting between the mobile terminal and said another mobile terminal or the wireless network.

The technical solutions of the embodiments of the disclosure provides advantageous effects including: a relative state of left and right sides of a screen of a touch screen mobile terminal is determined via gravity sensing, thereby enabling a current operation state of a user based on the relative state, e.g. holding the touch screen mobile terminal by the left hand or holding the touch screen mobile terminal by the right hand. The menu key thus can be set in a position where the user can easily operate so that the user can conveniently operate the menu key. The embodiments of the disclosure take into account the operation habits of the user when determining the display position of the menu key and better facilitate the operation of the user on the menu key, resulting in an improved user experience and a better interaction between the user and the touch screen mobile terminal.

BRIEF DESCRIPTION OF THE DRAWINGS

Embodiments of the disclosure will be depicted with reference to the drawings briefly described in the following to better illustrate the technical solutions. Apparently the drawings merely illustrate some embodiments of the invention, and a person with ordinary skill in the art may conceive of other embodiments based on these drawings without an inventive effort.

DETAILED DESCRIPTION OF THE EMBODIMENTS

The embodiments of the disclosure will be described in further detail with reference to the drawings so that objects, technical solutions and advantages of the invention will be clear.

First Embodiment

Figure 1:
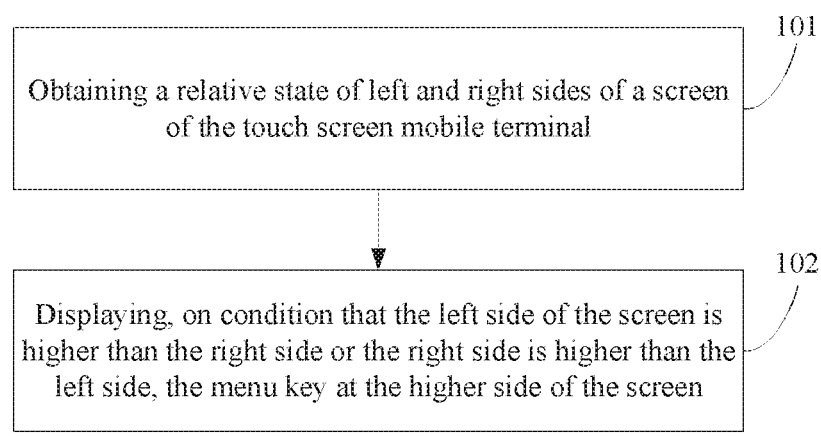
FIG. 1 illustrates a flowchart of a display method for a menu key of a touch screen mobile terminal provided by a first embodiment of the disclosure.

An embodiment of the disclosure provides a display method for a menu key of a touch screen mobile terminal. With reference to FIG. 1, the method may include:

Step 101: obtaining a relative state of left and right sides of a screen of the touch screen mobile terminal.

Specifically, a gravity sensing device within the mobile terminal, e.g. an accelerometer, may be used to determine the relative state of the current screen. Preferably, a tri-axial accelerometer may be used.

Specifically, taking a cell phone as an example for the mobile terminal. A tri-axial accelerometer may be built therein. When determining the relative state of the current screen, the left and right sides in a plane of the screen for the cell phone in the portrait orientation may correspond to the negative and positive sides of X axis, the upper and lower sides in the plane of the cell phone may correspond to the positive and negative sides of Y axis, and the inside and outside of the plane of the cell phone may correspond to the positive and negative sides of Z axis respectively. An angle of inclination of the cell phone may be calculated with the angles formed to the three axes (or any two of the axes) to thereby calculate values of acceleration of gravity on the three axes, by which the relative state of the screen can be determined.

Step 102: displaying, on condition that the left side of the screen is higher than the right side or the right side is higher than the left side, the menu key at the higher side of the screen.

Specifically, when the left side of the screen is higher than the right side, the menu key is displayed on the left side of the current screen; and when the right side of the screen is higher than the left side, the menu key is displayed on the right side of the current screen.

In practice, the mobile terminal may be in an unstable environment. Therefore a detection period, e.g. 3 seconds, may be set. When the left side of the screen is higher than the right side for 3 seconds, the menu key is displayed on the left side of the current screen; on the other hand, when the right side of the screen is higher than the left side for 3 seconds, the menu key is displayed on the right side of the current screen.

Typically when a user uses a cell phone with a single hand, he/she may support one end of the cell phone with his/her little finger to prevent the cell phone from falling down. Therefore when the cell phone is held with a right hand, the left side will be higher than the right side and when the cell phone is held with a left hand, the right hand will be higher than the left side. It is noted that when the cell phone is held with the left hand, the area that can be conveniently operated is the right side of the screen, and when the cell phone is held with the right hand, the area that can be conveniently operated is the left side of the screen. Therefore in the embodiment, on condition that the left side of the screen is higher than the right side, the menu key is displayed on the left side of the current screen; and on condition that the right side of the screen is higher than the left side, the menu key is displayed on the right side of the current screen.

According to the embodiment, by determining the relative state of the left and right sides of the screen of the touch screen mobile terminal via gravity sensing, the current operation state of the user, e.g. holding the touch screen mobile terminal by the left hand or holding the touch screen mobile terminal by the right hand, can be determined in accordance with the relative state. The menu key can then be set at a position where the user can operate easily so that the user can operate the menu key conveniently. The embodiment takes into account the operation habits of the user when determining the display position of the menu key and better facilitates the operation of the user on the menu key, resulting in an improved user experience and a better interaction between the user and the touch screen mobile terminal.

Second Embodiment

Figure 2:
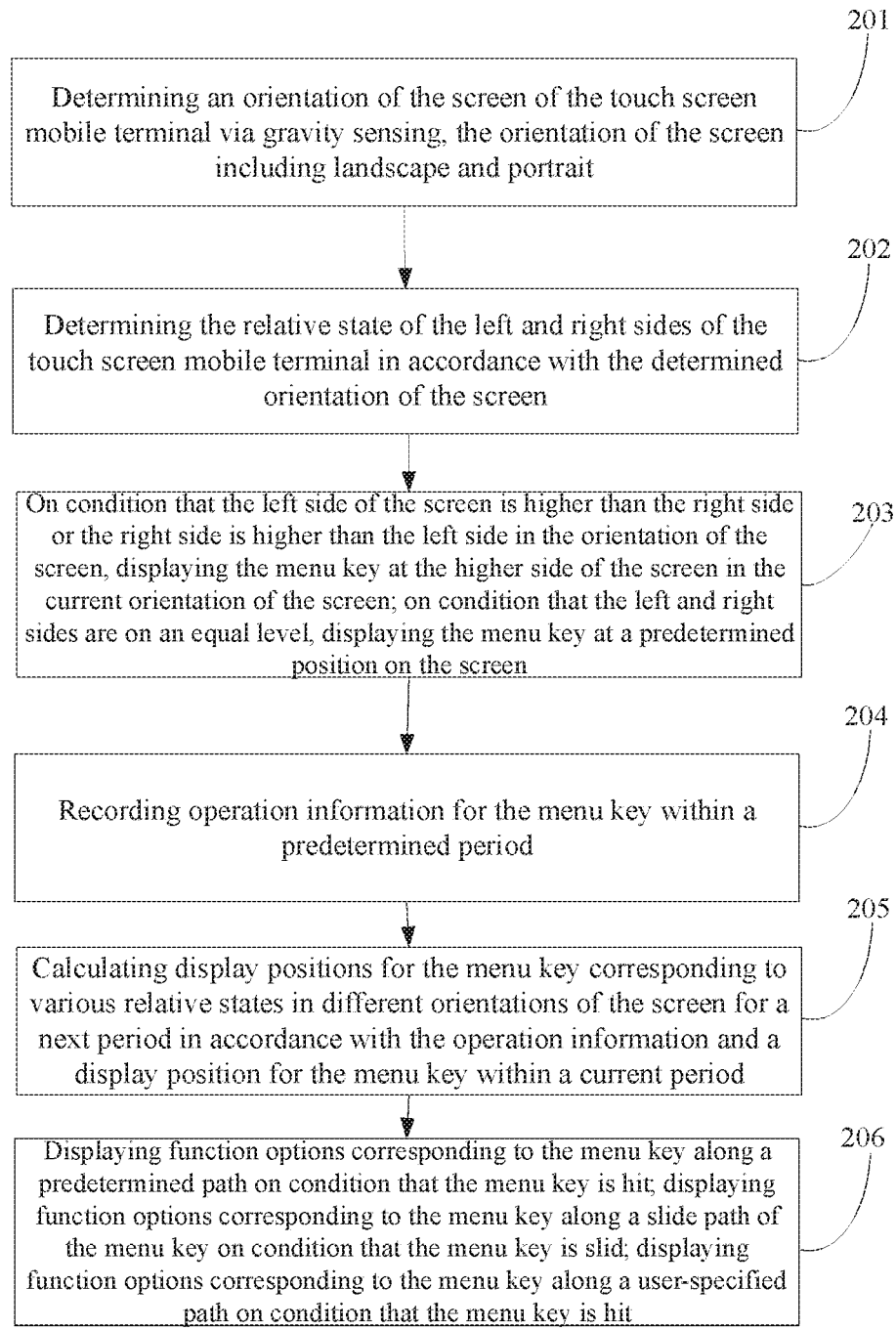
FIG. 2 illustrates a flowchart of a display method for a menu key of a touch screen mobile terminal provided by a second embodiment of the disclosure.

The embodiment of the disclosure provides a display method for a menu key of a touch screen mobile terminal. The method provided by the embodiment will be described in detail with a smart cell phone as an example of touch screen mobile terminal. With reference to FIG. 2, the display method for a menu key of a touch screen mobile terminal provide by the embodiment may include:

Step 201: determining an orientation of the screen of the touch screen mobile terminal via gravity sensing, the orientation of the screen including landscape and portrait.

Step 202: determining the relative state of the left and right sides of the touch screen mobile terminal in accordance with the determined orientation of the screen.

Specifically, a gravity sensing device within the touch screen mobile terminal, e.g. an accelerometer, may be used to determine the orientation and the relative state of the left and right sides of the current screen.

Taking a smart cell phone as an example, which has a tri-axial accelerometer built-in. When the cell phone is in the portrait orientation, the left and right sides in a plane of the screen may correspond to the negative and positive sides of X axis, the upper and lower sides in the plane of the cell phone may correspond to the positive and negative sides of Y axis, and the inside and outside of the plane of the cell phone may correspond to the positive and negative sides of Z axis respectively. The space formed by the three axes suffice for the detection of various actions on the smart cell phone. In practice, an angle of inclination of the smart phone will typically be calculated in angles to the three axes (or any two of them) for calculating values of acceleration of gravity. When the cell phone is stationary, none of the values of acceleration on the three axes will be greater than 1 regardless of the manner in which the cell phone is placed. Take the value of acceleration of gravity of the stationary cell phone as 1, the range for the value of g will be $-1 \leq g \leq 1$. When an absolute value of the acceleration of gravity on the X axis is greater than an absolute value of the acceleration of gravity on the Y axis: if the acceleration of gravity on the X axis is $g>0$, then the screen is currently in the portrait orientation and the left side is higher than the right side; if the acceleration of gravity on the X axis is $g<0$, then the screen is currently in the portrait orientation and the right side is higher than the left side; and if the acceleration of gravity on the X axis is $g=0$, then the screen is currently in the portrait orientation and the left and right sides are on an equal level. When an absolute value of the acceleration of gravity on the Y axis is greater than an absolute value of the acceleration of gravity on the X axis: if the acceleration of gravity on the Y axis is $g>0$, then the screen is currently in the landscape orientation and the left side is higher than the right side if the negative side of the Y axis of the current screen is the left side or the right side is higher than the left side if the positive side of the Y axis of the current screen is the left side; if the acceleration of gravity on the Y axis is $g<0$, then the screen is currently in the landscape orientation and the right side is higher than the left side if the negative side of the Y axis of the current screen is the left side or the left side is higher than the right side if the positive side of the Y axis of the current screen is the left side; and if the acceleration of gravity on the Y axis is g=0, then the screen is currently in the landscape orientation and the left and right sides are on an equal level.

In practice, the mobile terminal may be in an unstable environment. Therefore a detection period, e.g. 3 seconds, may be set. When the mobile terminal is maintained in a certain relative state for 3 seconds, the menu key may be displayed on a position corresponding to the relative state.

With the above steps 201-202, it is possible to obtain the relative state of the left and right sides of the screen of the touch screen mobile terminal.

Step 203: on condition that the left side of the screen is higher than the right side or the right side is higher than the left side in the orientation of the screen, displaying the menu key at the higher side of the screen in the current orientation of the screen; on condition that the left and right sides are on an equal level, displaying the menu key at a predetermined position on the screen.

Specifically, if the left side of the screen is higher than the right side, the menu key may be displayed at the left side of the current screen; if the right side of the screen is higher than the left side, the menu key may be displayed at the right side of the current screen. If the left and right sides of the screen are on an equal level, the menu key may be displayed at a predetermined position on the screen. The predetermined position may be any position on the screen. Preferably, the predetermined position may be set at the left side of the screen as most users typically use cell phones with their right hands; thus when the left and right sides of the screen are on an equal level, the menu key may be displayed at the left side of the screen by default.

In practice, the mobile terminal may be in an unstable environment. Therefore a detection period, e.g. 3 seconds, may be set. When the left side of the screen is higher than the right side for 3 seconds, the menu key is displayed on the left side of the current screen; on the other hand, when the right side of the screen is higher than the left side for 3 seconds, the menu key is displayed on the right side of the current screen.

Typically when a user uses a cell phone with a single hand, he/she may support one end of the cell phone with his/her little finger to prevent the cell phone from falling down. Therefore when the cell phone is held with a right hand, the left side will be higher than the right side and when the cell phone is held with a left hand, the right hand will be higher than the left side. It is noted that when the cell phone is held with the left hand, the area that can be conveniently operated is the right side of the screen, and when the cell phone is held with the right hand, the area that can be conveniently operated is the left side of the screen. Therefore in the embodiment, on condition that the left side of the screen is higher than the right side, the menu key is displayed on the left side of the current screen; and on condition that the right side of the screen is higher than the left side, the menu key is displayed on the right side of the current screen.

Specifically, the menu key may be displayed in the following manner: considering the four midpoints of the upper, lower, left and right sides of the current screen, a line connecting the midpoints of the left and right sides is referred to as a horizontal midline, and a line connecting the midpoints of the upper and lower sides is referred to as a vertical midline. The current screen may be divided into four regions by the horizontal and vertical midlines of the current screen: a lower-left region, a lower-right region, an upper-left region and an upper-right region. When the screen is in the landscape orientation and the right side of the screen is higher than the left side, the menu key is displayed in the lower-right region of the current landscape screen; when the screen is in the landscape orientation and the left side of the screen is higher than the right side, the menu key is displayed in the lower-left region of the current landscape screen; when the screen is in the portrait orientation and the right side of the screen is higher than the left side, the menu key is displayed in the lower-right region of the current portrait screen; when the screen is in the portrait orientation and the left side of the screen is higher than the right side, the menu key is displayed in the lower-left region of the current portrait screen; and when the left and right sides of the screen is on an equal level, the menu key is displayed at a predetermined position on the current screen.

Step 204: recording operation information for the menu key within a predetermined period.

The operation information may include an operation trajectory in which a user operates the menu key, the relative state of left and right sides of the screen and the orientation of the screen of the touch screen mobile terminal when being operated, and a type of the operation trajectory. The type of the operation trajectory may include a valid operation trajectory that passes through a display position of the menu key and an invalid operation trajectory that does not pass through the display position of the menu key.

The predetermined period may be one day or one week, or its specific length may be set by the user as he/she desires.

Step 205: calculating display positions for the menu key corresponding to various relative states in different orientations of the screen for a next period in accordance with the operation information and a display position for the menu key within a current period.

Specifically, the display positions for the menu key corresponding to various relative states in different orientations of the screen for the next period are calculated respectively based on the equation of:

$$Vc = A*Vi + (1-A)*Vj,$$

wherein A indicates a value of ratio of a number of the valid operation trajectories to the invalid operation trajectories corresponding to various relative states in different orientations of the screen within the period, Vi indicates coordinates of the display position for the menu key within the current period, and Vj indicates average position coordinates for the invalid operation trajectories.

When calculating the average position coordinates Vj for the invalid operation trajectories, the average position coordinates for the start positions in the invalid operation trajectories may be calculated first, i.e. an arithmetic average value of the coordinates for all the points may be taken as the coordinates of an average position, and then the average position coordinates for the end positions may be calculated. The average trajectory is one from the start average position to the end average position, and the midpoint of the average trajectory is taken for the average position coordinates Vj for the invalid operations.

Specifically, it is possible to calculate, when the application is invoked for the first time in a period, the display position corresponding to different relative states in the period; it is also possible to calculate, at the end of a previous period, the display position corresponding to different relative states in its next period; it is also possible to calculate, following an instruction from the user, the display position for the menu key for the next time. In the embodiment, the timing for calculating the display position is not limited.

It is noted that the display position within the first period may be predetermined.

Step 206: displaying function options corresponding to the menu key along a predetermined path on condition that the menu key is hit; displaying function options corresponding to the menu key along a slide path of the menu key on condition that the menu key is slid; and displaying function options corresponding to the menu key along a user-specified path on condition that the menu key is hit.

All the function options corresponding to the menu key may be displayed along a predetermined path, which may be a semicircular arc, on condition that the menu key is hit; the function options displayed in this shape may facilitate use's operation on the function options.

For a predetermined path of a semicircular arc, the step of displaying the function options corresponding to the menu key along the predetermined path on condition that the menu key is hit may specifically include: arranging the function options corresponding to the menu key onto the semicircular arc in a certain interval from the left to the right (or from the right to the left); alternatively, the function options corresponding to the menu key may be arranged onto the semicircular arc in different intervals from the left to the right (or from the right to the left).

It is noted that the predetermined path may be a line, or another shape, or an animation. If the predetermined path is a line, the function options corresponding to the menu key may be arranged onto the line in a certain interval from the left to the right (or from the right to the left); alternatively, the function options corresponding to the menu key may be arranged onto the line in different intervals from the left to the right (or from the right to the left). The different intervals may be intervals predetermined according to a rule, e.g. an arithmetic sequence of numbers or a sequence of prime numbers, or may be arbitrary intervals, e.g. 1, 1, 2, 1, 3, or the like. When the predetermined path is an animation, the function options corresponding to the menu key may be displayed one by one in the animation according to the names of the function options. For example, the animation may be one that displays a function option at regular time intervals, and the function options is not limited, e.g. it may be displayed in a random order or in an order of the names of the function options. When the predetermined path is of another shape, e.g. a "~" shape, the function options corresponding to the menu key may be arranged onto a track of the shape in a certain interval from the left to the right (or from the right to the left); alternatively, the function options corresponding to the menu key may be arranged onto a track of the shape in different intervals from the left to the right (or from the right to the left). The manner of displaying the function options when the menu key is hit is not limited, but may be set based on the user's preference.

The function options corresponding to the menu key may be displayed along a slide path of the menu key on condition that the menu key is slid. Preferably, all the function options are evenly displayed on the path. For example, if the user slides the menu key along an arc, the function options may emerge along the arc and are displayed as evenly distributed on the arc; if the user slides the menu key along a line, the function options may emerge along the line and are displayed as evenly distributed on the line.

The user-specified path may be set by a user according to his/her own habit. For example, based on his/her habit of using the cell phone, e.g. holding the cell phone with the left hand or the right hand, the user may set the path to be a semicircular arc that is higher on the left side than on the right side or that is higher on the right side than on the left side. When the menu key is hit, the function options corresponding to the menu key may be displayed along the user-specified path corresponding to the holding state. Alternatively, the cell phone may provide a function of setting a display path to the user, and the user may set a user-specified path in advance depending on his/her preference. When the menu key is hit, the function options corresponding to the menu key are displayed in accordance with the user-specified path. For example, if a line with a slope of K is set, then when the menu key is hit, the function options corresponding to the menu key may be displayed in accordance with the line with the slope of K, which will not be elaborated herein.

Specifically, it can be determined via a click event whether the user hit the menu key or slides the menu key. This technique is well known to those skilled in the art and will not be elaborated herein.

It is to be noted that in the embodiment, the orientation of the screen and the relative state of the left and right sides of the screen are both determined via gravity sensing. In another implementation of the present disclosure, it is also possible to determine the relative state of the left and right sides of the screen only for a default screen orientation (e.g. the portrait orientation), and in this case it is not necessary to determine the orientation of the screen via gravity sensing.

According to the embodiment, by determining the relative state of the left and right sides of the screen of the touch screen mobile terminal via gravity sensing, the current operation state of the user, e.g. holding the touch screen mobile terminal by the left hand or holding the touch screen mobile terminal by the right hand, can be determined in accordance with the relative state. The menu key can then be set at a position where the user can operate easily so that the user can operate the menu key conveniently. The embodiment takes into account the operation habits of the user when determining the display position of the menu key and better facilitates the operation of the user on the menu key, resulting in an improved user experience and a better interaction between the user and the touch screen mobile terminal. Further, according to the embodiment, the display position may be adjusted in every period so that the user may operate more conveniently and the likelihood of the menu key being successfully selected can be increased. The display path for the function options may be set according to the user's operation on the menu key, eliminating the necessity of opening the menu in a new page and preventing the current action by the user from being interrupted; this facilitates the user's operation on the function options and results in a further improved user experience and a better human-machine interaction.

Third Embodiment

Figure 3:
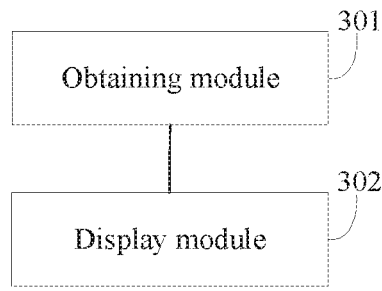
FIG. 3 illustrates a structure of a display device for a menu key of a touch screen mobile terminal provided by a third embodiment of the disclosure.

With reference to FIG. 3, an embodiment of the disclosure provides a display device for a menu key of a touch screen mobile terminal, which is applicable to the display method for a menu key of a touch screen mobile terminal provided by the first embodiment. The device may include:

An obtaining module 301 configured to obtain a relative state of left and right sides of a screen of the touch screen mobile terminal.

A display module 302 configured to display, on condition that the left side of the screen is higher than the right side or the right side is higher than the left side, the menu key at the higher side of the screen.

According to the embodiment, by determining the relative state of the left and right sides of the screen of the touch screen mobile terminal via gravity sensing, the current operation state of the user, e.g. holding the touch screen mobile terminal by the left hand or holding the touch screen mobile terminal by the right hand, can be determined in accordance with the relative state. The menu key can then be set at a position where the user can operate easily so that the user can operate the menu key conveniently. The embodiment takes into account the operation habits of the user when determining the display position of the menu key and better facilitates the operation of the user on the menu key, resulting in an improved user experience and a better interaction between the user and the touch screen mobile terminal.

Fourth Embodiment

Figure 4:
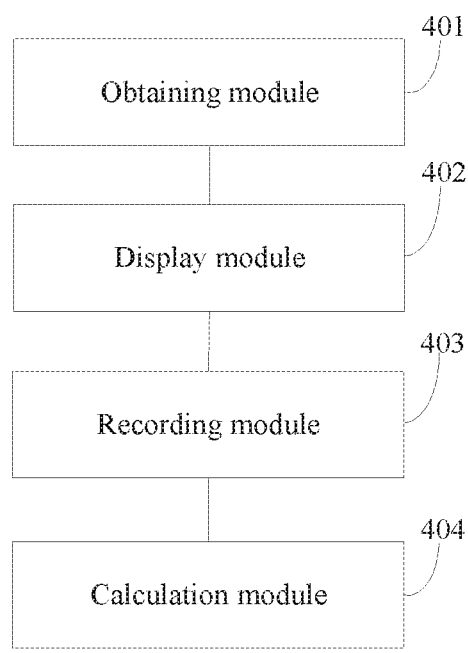
FIG. 4 illustrates a structure of a display device for a menu key of a touch screen mobile terminal provided by a fourth embodiment of the disclosure.

An embodiment of the disclosure provides a display device for a menu key of a touch screen mobile terminal, which is applicable to the display method for a menu key of a touch screen mobile terminal provided by the second embodiment. With reference to FIG. 4, the device may include:

An obtaining module 401 configured to obtain a relative state of left and right sides of a screen of the touch screen mobile terminal.

A display module 402 configured to display, on condition that the left side of the screen is higher than the right side or the right side is higher than the left side, the menu key at the higher side of the screen.

Figure 5:
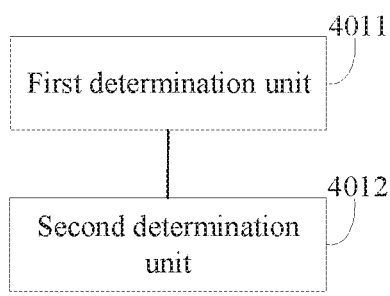
FIG. 5 illustrates a structure of an obtaining module provided in the fourth embodiment.

With reference to FIG. 5, the obtaining module 401 may preferably includes:

A first determination unit 4011 configured to determine an orientation of the screen of the touch screen mobile terminal via gravity sensing, the orientation of the screen including landscape and portrait; and a second determination unit 4012 configured to determine the relative state of the left and right sides of the touch screen mobile terminal in accordance with the determined orientation of the screen.

The device may further include:

A recording module 403 configured to record operation information for the menu key within a predetermined period, wherein the operation information may include an operation trajectory in which a user operates the menu key, the relative state of left and right sides of the screen and the orientation of the screen of the touch screen mobile terminal when being operated, and a type of the operation trajectory, the type of the operation trajectory including a valid operation trajectory and an invalid operation trajectory.

A calculation module 404 configured to calculate display positions for the menu key corresponding to various relative states in different orientations of the screen for a next period in accordance with the operation information and a display position for the menu key within a current period recorded by the calculation module 403.

Specifically, the calculation module 404 may calculate the display positions for the menu key corresponding to various relative states in different orientations of the screen for the next period respectively based on the equation of:

$$Vc = A*Vi + (1-A)*Vj,$$

wherein A indicates a value of ratio of a number of the valid operation trajectories to the invalid operation trajectories corresponding to various relative states in different orientations of the screen within the period, Vi indicates coordinates of the display position for the menu key within the current period, and Vj indicates average position coordinates for the invalid operation trajectories.

When calculating the average position coordinates Vj for the invalid operation trajectories, the average position coordinates for the start positions in the invalid operation trajectories may be calculated first, i.e. an arithmetic average value of the coordinates for all the points may be taken as the coordinates of an average position, and then the average position coordinates for the end positions may be calculated. The average trajectory is one from the start average position to the end average position, and the midpoint of the average trajectory is taken for the average position coordinates Vj for the invalid operations.

Specifically, it is possible to calculate, when the application is invoked for the first time in a period, the display position corresponding to different relative states in the period; it is also possible to calculate, at the end of a previous period, the display position corresponding to different relative states in its next period; it is also possible to calculate, following an instruction from the user, the display position for the menu key for the next time. In the embodiment, the timing for calculating the display position is not limited.

It is noted that the display position within the first period may be predetermined.

Optionally, the display module 402 is further configured to display the menu key at a predetermined position on the screen of the touch screen mobile terminal on condition that the left and right sides are on an equal level.

Preferably, the display module 402 is further configured to: display function options corresponding to the menu key along a predetermined path on condition that the menu key is hit; display function options corresponding to the menu key along a slide path of the menu key on condition that the menu key is slid; and display function options corresponding to the menu key along a user-specified path on condition that the menu key is hit.

According to the embodiment, by determining the relative state of the left and right sides of the screen of the touch screen mobile terminal via gravity sensing, the current operation state of the user, e.g. holding the touch screen mobile terminal by the left hand or holding the touch screen mobile terminal by the right hand, can be determined in accordance with the relative state. The menu key can then be set at a position where the user can operate easily so that the user can operate the menu key conveniently. The embodiment takes into account the operation habits of the user when determining the display position of the menu key and better facilitates the operation of the user on the menu key, resulting in an improved user experience and a better interaction between the user and the touch screen mobile terminal. Further, according to the embodiment, the display position may be adjusted in every period so that the user may operate more conveniently and the likelihood of the menu key being successfully selected can be increased. The display path for the function options may be set according to the user's operation on the menu key, eliminating the necessity of opening the menu in a new page and preventing the current action by the user from being interrupted; this facilitates the user's operation on the function options and results in a further improved user experience and a better human-machine interaction.

It is to be noted that the device provided by the above embodiment is illustrated by being divided the functional modules upon displaying the menu key. In practice, the above functions may be assigned to different functional modules as desired, and in other words, the device may be differently divided into functional modules to achieve all or part of the above described functions. In addition, the display device for a menu key of a touch screen mobile terminal provided by the above embodiment is derived from the same concept as the display method for a menu key of a touch screen mobile terminal from the embodiment; its implementation may be found in the embodiment regarding the method and will not be elaborated herein.

Third Embodiment

Figure 6:
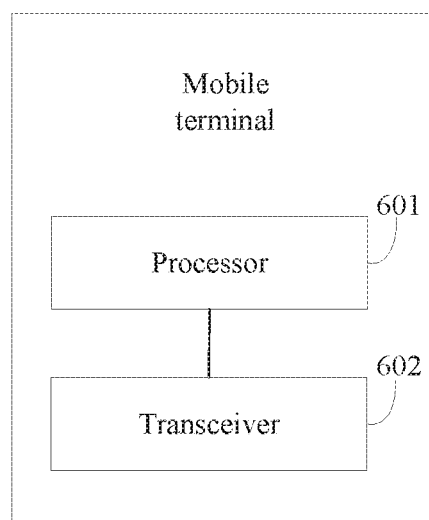
FIG. 6 illustrates a structure a mobile terminal provided by the fifth embodiment.

The embodiment of the disclosure provides a mobile terminal, which may be a handheld device with the functionality of wireless connection, or another processing device coupled to a wireless modem, or a mobile terminal in communication with one or more core network via a wireless access network. For example, the mobile terminal may be a mobile phone (or referred to as a "cellular phone"), a computer with a mobile terminal; the mobile terminal may also be a mobile terminal which is portable, pocket, handheld, built in a computer, or carried by a vehicle. With reference to FIG. 6, the mobile terminal provided by the embodiment may include: a processor 601 and a transceiver 602, the processor 601 and the transceiver 602 being coupled together.

The processor 601 is configured to obtain a relative state of left and right sides of a screen of the touch screen mobile terminal; and display, on condition that the left side of the screen is higher than the right side or the right side is higher than the left side, the menu key at the higher side of the screen.

the transceiver 602 is configured to establish communication between the mobile terminal and another mobile terminal or a wireless network to implement data receiving and transmitting between the mobile terminal and said another mobile terminal or the wireless network.

Preferably, the processor 601 is further configured to: determine an orientation of the screen of the touch screen mobile terminal via gravity sensing, the orientation of the screen including landscape and portrait; and determine the relative state of the left and right sides of the touch screen mobile terminal in accordance with the determined orientation of the screen.

Further, the processor 601 may be further configured to: record operation information for the menu key within a predetermined period, wherein the operation information includes an operation trajectory in which a user operates the menu key, the relative state of left and right sides of the screen and the orientation of the screen of the touch screen mobile terminal when being operated, and a type of the operation trajectory, the type of the operation trajectory including a valid operation trajectory and an invalid operation trajectory; and calculate display positions for the menu key corresponding to various relative states in different orientations of the screen for a next period in accordance with the operation information and a display position for the menu key within a current period.

Specifically, the processor 601 may be configured to calculate the display positions for the menu key corresponding to various relative states in different orientations of the screen for the next period respectively based on the equation of:

$$Vc=A*Vi+(1-A)*Vj,$$

wherein A indicates a value of ratio of a number of the valid operation trajectories to the invalid operation trajectories corresponding to various relative states in different orientations of the screen within the period, Vi indicates coordinates of the display position for the menu key within the current period, and Vj indicates average position coordinates for the invalid operation trajectories.

Optionally, the processor 601 is further configured to: display the menu key at a predetermined position on the screen of the touch screen mobile terminal on condition that the left and right sides are on an equal level.

Preferably, the processor 601 is further configured to: display function options corresponding to the menu key along a predetermined path on condition that the menu key is hit;

display function options corresponding to the menu key along a slide path of the menu key on condition that the menu key is slid; and display function options corresponding to the menu key along a user-specified path on condition that the menu key is hit.

According to the embodiment, by determining the relative state of the left and right sides of the screen of the touch screen mobile terminal via gravity sensing, the current operation state of the user, e.g. holding the touch screen mobile terminal by the left hand or holding the touch screen mobile terminal by the right hand, can be determined in accordance with the relative state. The menu key can then be set at a position where the user can operate easily so that the user can operate the menu key conveniently. The embodiment takes into account the operation habits of the user when determining the display position of the menu key and better facilitates the operation of the user on the menu key, resulting in an improved user experience and a better interaction between the user and the touch screen mobile terminal. Further, according to the embodiment, the display position may be adjusted in every period so that the user may operate more conveniently and the likelihood of the menu key being successfully selected can be increased. The display path for the function options may be set according to the user's operation on the menu key, eliminating the necessity of opening the menu in a new page and preventing the current action by the user from being interrupted; this facilitates the user's operation on the function options and results in a further improved user experience and a better human-machine interaction.

The embodiments of the disclosure are numbered as above merely for the purpose of description, and does not hint any order of quality.

It is apparent to a person of ordinary skill in the art that all or part of the steps for the above embodiments may be implemented by hardware, or by a program to instruct relevant hardware. The program may be stored on a computer readable medium, which may be a read only memory, a magnetic disc or an optical disc.

The inventive disclosure has been described above in terms of specific embodiments which, however, are not intended to limit the scope of the inventive concept. All the modifications, alternatives and improvements within the spirit and concept of the invention should be encompassed by the invention.

What is claimed is:

1. A method, comprising:
identifying left and right sides of a touch screen of a mobile terminal, among four sides of the touch screen, based on a current orientation mode of the touch screen, wherein the current orientation mode of the touch screen is one of landscape mode and portrait mode;
determining which one of the identified left and right sides of the touch screen is located higher than the other one;
automatically moving, at the same current orientation mode, a menu key displayed on the touch screen from a current display position to a display position at the higher one of the identified left and right sides comprising:
when the current display position of the menu key is at the lower one of the identified left and right sides, automatically moving the menu key to the higher one of the identified left and right side at the current orientation mode;
recording operation information for the menu key within a current period in which the menu key is being displayed at the higher one of the identified left and right sides, wherein the operation information comprises position coordinates of an operation trajectory and a type of the operation trajectory, and wherein the type of the operation trajectory comprises a valid operation trajectory that passes through a display position of the menu key and an invalid operation trajectory that does not pass through the display position of the menu key;
when the operation information indicates the type of the operation trajectory is the valid operation trajectory and the menu key is slid along a slide path based on the operation information, displaying function options corresponding to the menu key along the slide path of the menu key; and
wherein the automatically moving of the menu key is based on a display position calculated from the recorded operation information.

2. The method of claim 1, further comprising:
calculating a display position for the menu key when the menu key is to be displayed at the same higher one of the identified left and right sides again at a later period, based on the recorded operation information and the display position of the menu key within the current period.

3. The method of claim 2, wherein the calculating a display position for the menu key when the menu key is to be displayed at the same higher one of the identified left and right sides again at a later period comprises:
calculating a display position for the menu key when the menu key is to be displayed at the same higher one of the identified left and right sides again at a later period based on an equation of:

$Vc = A*Vi \pm (1-A)*Vj$, wherein A indicates a value of ratio of a number of the valid operation trajectories to a total number of the operation trajectories occurred within the current period, Vi indicates coordinates of the display position for the menu key within the current period, and Vj indicates average position coordinates for the invalid operation trajectories.

4. The method of claim 1, wherein the higher one of the identified left and right sides is determined via gravity sensing.

5. The method according to claim 1, further comprising:
in response to determining that the identified left side and right side are located in an equal height, displaying the menu key at a predetermined position on the touch screen of the mobile terminal.

6. The method according to claim 1, further comprising:
displaying function options corresponding to the menu key along a predetermined path on condition that the menu key is hit.

7. The method according to claim 1, further comprising:
displaying function options corresponding to the menu key along a user-specified path on condition that the menu key is hit.

8. The method of claim 1, wherein the mobile terminal is a hand-held mobile terminal device and can be operated by a user with a single hand.

9. The method of claim 1, wherein the determining which one of the identified left and right sides of the touch screen is located higher than the other one comprises:
on the condition that the identified left side of the touch screen is located higher than the identified right side for more than a predetermined time interval, determining the identified left side as the higher one; and
on the condition that the identified right side of the touch screen is located higher than the identified left side for more than a predetermined time interval, determining the identified right side as the higher one.

10. An apparatus comprising:
a processor; and
a memory containing instructions executable by the processor,
wherein the processor is configured to:
identify left and right sides of a touch screen of a mobile terminal based on a current orientation mode of the touch screen, wherein the current orientation mode of the touch screen is one of landscape mode and portrait mode;
determine which one of the identified left and right sides of the touch screen is located higher than the other one;
automatically move, at the same current orientation mode, a menu key displayed on the touch screen from a current display position to a display position at the higher one of the identified left and right sides, comprising:
when the current display position of the menu key is at the lower one of the identified left and right sides, automatically moving the menu key to the higher one of the identified left and right side at the current orientation mode;
record operation information for the menu key within a current period in which the menu key is being displayed at the higher one of the identified left and right sides, wherein the operation information comprises position coordinates of an operation trajectory and a type of the operation trajectory, and wherein the type of the operation trajectory comprises a valid operation trajectory that passes through a display position of the menu key and an invalid operation trajectory that does not pass through the display position of the menu key
when the operation information indicates the type of the operation trajectory is the valid operation trajectory and the menu key is slid along a slide path based on the operation information, display function options corresponding to the menu key along the slide path of the menu key; and wherein the automatically moving of the menu key is based on a display position calculated from the recorded operation information.

11. The apparatus of claim 10, wherein the processor is further configured to:
calculate a display position for the menu key when the menu key is to be displayed at the same higher one of the identified left and right sides again at a later period, based on the recorded operation information and the display position of the menu key within the current period.

12. The apparatus of claim 11, wherein the processor is further configured to:
calculate a display position for the menu key when the menu key is to be displayed at the same higher one of the identified left and right sides again at a later period based on an equation of:

$Vc = A*Vi \pm (1-A)*Vj,$ wherein A indicates a value of ratio of a number of the valid operation trajectories to a total number of the operation trajectories occurred within the current period, Vi indicates coordinates of the display position for the menu key within the current period, and Vj indicates average position coordinates for the invalid operation trajectories.

13. The apparatus of claim 10, wherein the higher one of the identified left and right sides is determined via gravity sensing.

14. The apparatus of claim 10, wherein the processor is further configured to:
in response to determining that the identified left side and right side are located in an equal height, display the menu key at a predetermined position on the touch screen of the mobile terminal.

15. The apparatus of claim 10, wherein the processor is further configured to:
display function options corresponding to the menu key along a predetermined path on condition that the menu key is hit.

16. The apparatus of claim 10, wherein the processor is further configured to:
display function options corresponding to the menu key along a user-specified path on condition that the menu key is hit.

17. The apparatus of claim 10, wherein the mobile terminal is a hand-held mobile terminal device and can be operated by a user with a single hand.

18. The apparatus of claim 10, wherein the processor is further configured to:
determine the identified left side as the higher one, on the condition that the identified left side of the touch screen is located higher than the identified right side for more than a predetermined time interval, and
determine the identified right side as the higher one, on the condition that the identified right side of the touch screen is located higher than the identified left side for more than a predetermined time interval.

19. The method of claim 1, wherein displaying function options corresponding to the menu key along the slide path of the menu key comprises:
evenly displaying the function options on the slide path of the menu key.

20. The method of claim 1, wherein displaying function options corresponding to the menu key along the slide path of the menu key comprises:
if the menu key is slid along an arc, emerging the function options along the arc; and
if the menu key is slid along a line, emerging the function options along the line.

* * * * *